Aug. 20, 1957 R. J. BARCLAY ET AL 2,803,736
ELECTRODE MOUNTING FOR RESISTANCE WELD TUBE MILLS
Filed March 19, 1956 2 Sheets-Sheet 1

INVENTORS
ROBERT J. BARCLAY
RALPH L. HANKIN
BY
*Malcolm W. Fraser*
ATTORNEY

Aug. 20, 1957  R. J. BARCLAY ET AL  2,803,736
ELECTRODE MOUNTING FOR RESISTANCE WELD TUBE MILLS
Filed March 19, 1956  2 Sheets-Sheet 2

INVENTORS
ROBERT J. BARCLAY
RALPH L. HANKIN
BY
ATTORNEY

United States Patent Office 2,803,736
Patented Aug. 20, 1957

2,803,736

ELECTRODE MOUNTING FOR RESISTANCE WELD TUBE MILLS

Robert J. Barclay, Toledo, and Ralph L. Hankin, Holland, Ohio, assignors to The Etna Machine Company, Perrysburg, Ohio, a corporation of Ohio Application March 19, 1956, Serial No. 572,370

3 Claims. (Cl. 219—84)

This invention relates to rotary electric resistance welders of the type employed in continuous mills for producing tubing, the seams of which are butt welded.

An object is to improve the assembly of the electrode wheels so that the desired electrical connection between the electrode wheels and current-carrying members is insured.

A further object is to produce a simple and efficient mounting for the electrode wheels, which is sturdy and rugged and enables the wheels to be effectively assembled simply and speedily and at the same time brought into close juxtaposition with current-carrying parts, thereby obviating difficulties heretofore encountered, particularly when great care was not exercised. Not infrequently in the past, adequate and proper contact has not been established between the electrode wheels and the current-carrying members, resulting in inefficient and unsatisfactory welding operation. In accordance with this invention, the desired results are achieved much more simply and without requiring the skill and care previously necessitated.

Figure 1:
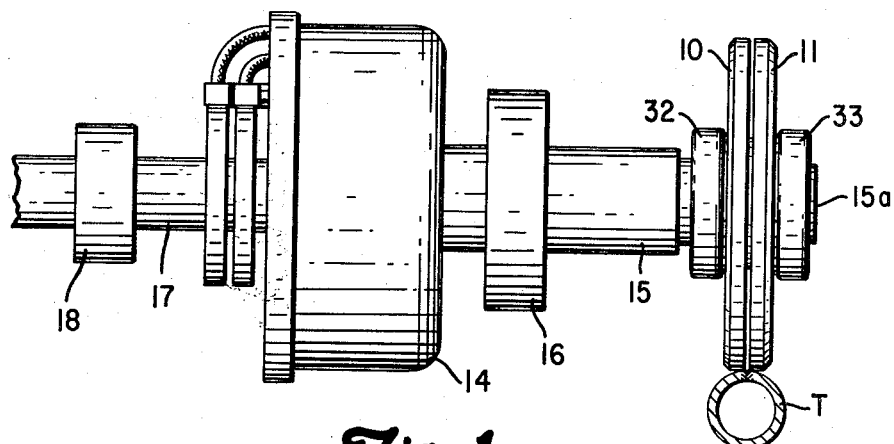
Figure 3:
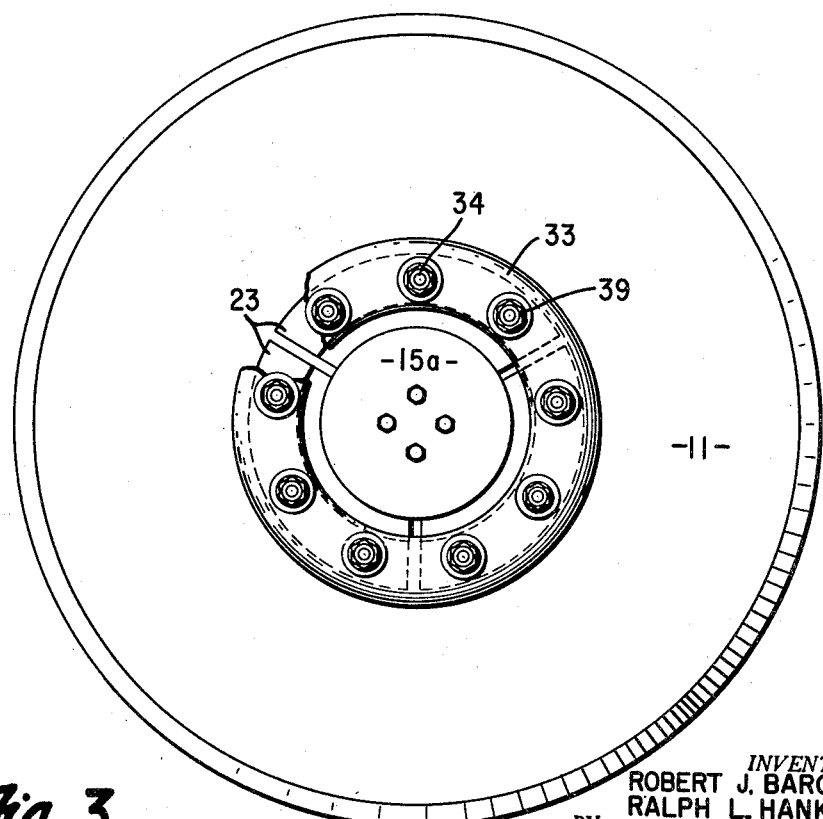
Figure 2:
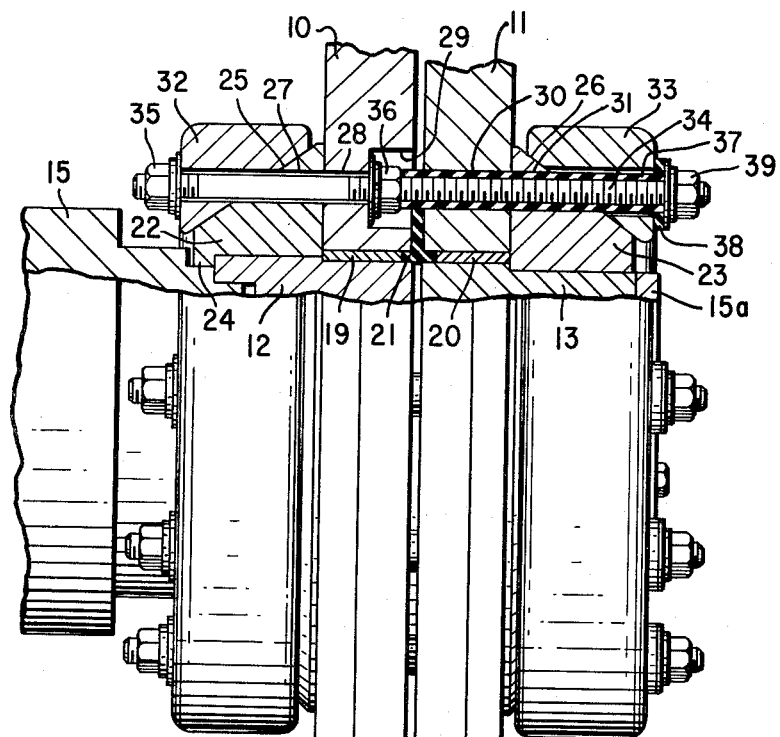
Figure 2:
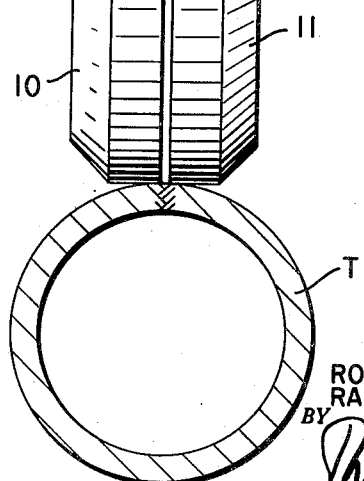

Other objects and advantages will hereinafter appear and for purposes of illustration but not of limitation, an embodiment of the invention is shown on the accompanying drawings in which Figure 1 is a side elevation, a part being broken away, of a rotary resistance welding transformer for seaming tubing as the latter advances;

Figure 2 is an enlarged elevation of the electrode wheel assembly, a part being shown in section to show the means by which the electrode wheels are mounted in position of use; and Figure 3 is an end elevation of the electrode wheel assembly and associated parts.

The illustrated embodiment of the invention comprises a pair of circular electrode wheels 10 and 11 which have parallel flat sides and which are adapted to roll along an advancing tube T for butt welding the longitudinally extending free edge portions, as will be well understood by those skilled in this art. Electric current is delivered to the electrode wheels by rings 12 and 13 associated with the wheels 10 and 11 respectively, these rings forming part of the secondary of a transformer 14 which is provided with an axially extending neck member 15 rotating in a stationary bearing member 16. At the opposite end of the transformer 14 is an axially extending shaft 17 supported in a bearing member 18.

Interposed between the current-carrying ring 12 and the electrode wheel 10 is a bearing ring 19 and interposed between the current-carrying ring 13 and the electrode wheel 11 is a bearing ring 20. Interposed between the rings 19 and 20 and insulating the inner portions of the electrode wheels 10 and 11 from each other is a T-shaped electrical insulating member 21.

The electric current from the rings 12 and 13 passes to the wheels 10 and 11 through segmental copper rings 22 and 23 which intimately engage the rings 12 and 13 respectively on one side and flatly abut against the outer sides of the respective electrode wheels. The segmental rings 23 abut against a shoulder formed on the ring 13 and the segmental rings 22 have inwardly extending peripheral flanges 24 which abut against the side of the current-carrying ring 12.

In this instance, each segmental ring 22 and 23 is in three equal sections for a purpose hereinafter described. The segmental rings 22 and 23 have oppositely inclined outer surfaces, the surfaces 25 on the rings 22 inclining downwardly and inwardly and the surfaces 26 on the rings 23 inclining downwardly and outwardly, as shown on Figure 2.

Each of the ring segments 22 and 23 has three equidistantly spaced holes, these holes being indicated at 27 for the ring segments 22 and these are in register with holes 28 in the electrode wheel 10. On the inner side of each of the holes 28 is a socket 29 in the electrode wheel 10.

In the electrode wheel 11 and the ring segments 23 are somewhat larger holes 30 in the wheel 11 registering with holes 31 in the ring segments 23. These holes are in alignment with each other to enable a bolt to extend completely through the several holes.

Engaging the inclined surfaces 25 of the ring segments 22 is a solid steel ring 32 which has an internal inclined surface to bear against the inclined surface 25. Similarly a solid steel ring 33 has an inclined surface to engage the inclined surface 26 of the ring segments 23. The rings 32 and 33 are similarly apertured so that bolts 34 can extend through the several parts, namely the ring 33, the ring segments 23, the electrode wheels 11 and 10, the ring segments 22 and the steel ring 32. The bolt-receiving holes in the segmental rings 22 and 23 and steel rings 32 and 33 are slightly larger than the bolts 34 so that the ring segments can move slightly relative to the bolts.

For clamping the electrode wheel 10, the respective ring segments 22, and steel ring 32 together are nut and washer assemblies 35 which engage the outer face of the ring 32 and nut and washer assemblies 36 disposed within the sockets 29. It will be observed that the inner end portion of each bolt 34 is formed with screw threads and then the major portion of the bolt from the socket 29 to the outer end is screw-threaded. Enclosing the latter screw-threaded end is a sleeve 37 of electrical insulating material which abuts against the nut 36 and terminates near the outer end portion of the bolt. An electrical insulating washer 38 is disposed between the nut 39 on the outer end of the bolt and the outer face of the steel ring 33.

In practice it will be understood that the electrode wheel 10 is first assembled in place and then the bolts 34 are inserted through the registering apertures in the electrode wheel 10, the ring segments 22, and the steel ring 32. The bolts 34 have a snug fit with the electrode wheel 10. Then the nut and washer assemblies 35 and 36 are applied. By drawing up tightly on these nuts, it will be manifest that due to the inclined or cam surfaces between the steel ring 32 and the ring segments 22, the copper ring segments will be forced into engagement not only with the bearing ring 12 of the secondary but also flatwise against the outer side of the electrode wheel 10. Thus by tightening of the nuts 35 and 36, the ring segments 22 are cammed into engagement with the current-carrying part and also axially against the adjacent electrode wheel. Since there are three segments for the ring 22, several sets of nuts are gradually tightened so that a very satisfactory contact is achieved between these several parts.

After the electrode wheel 10 has been tightened in place so that the various current carrying parts are properly in engagement with each other so that the current will be effectively carried to the wheel 10, the insulating sleeve 37 is then slipped on the outer end portion of each bolt 34 and then the electrode wheel 11 is mounted in place. The wheel 11 fits the sleeve 37 snugly so that there is no looseness between the electrode wheel 11 and the bolts 34. Thereafter the ring segments 23 are applied to the projecting portions of the bolts and after that, the steel ring 33 is applied. By applying the nut and washer assemblies 39 and gradually tightening them up, the desired contact is established between the inner surfaces 23 of the ring segments and the current-carrying ring 13 of the transformer secondary and also the inner surface of the electrode rings 23 is forced at the same time into flatwise engagement with the outer side of the electrode wheel 11. In this manner the electrode wheels can be quickly and easily installed with the assurance that the several surfaces are in engagement to carry the current properly from the secondary rings to the electrode wheels.

Numerous changes in details of construction, arrangement and choice of materials may be effected without departing from the spirit of the invention, especially as defined in the appended claims.

What we claim is:

1. In a rotary resistance welder having a welding transformer with a pair of secondary terminal ring members axially insulated from each other, a pair of wheel electrodes parallel to but spaced axially and insulated from each other, segmental current carrying rings on the outer sides of said wheel electrodes respectively for intimate abutting engagement therewith, said rings also engaging said terminal ring members respectively, and means including bolt members common to said segmental rings and wheel electrodes, and cam devices actuated by said bolt members for concomitantly securing said parts as a rigid assembly and forcing the segmental rings into intimate contact with the electrodes and terminal ring members respectively.

2. The organization as claimed in claim 1 in which the cam devices comprise cam surfaces on the outer sides of the segmental rings, and a solid cam ring engaging the cam surfaces of each segmental ring, the bolts extending through the cam rings so that upon tightening nuts thereon the segmental rings are cammed into engagement with the respective electrode wheels and terminal ring members.

3. In a rotary resistance welder having a welding transformer with a pair of secondary terminal ring members axially insulated from each other, a pair of wheel electrodes parallel to but spaced axially and insulated from each other, segmental current-carrying rings on the outer sides of said wheel electrodes respectively for intimate abutting engagement therewith, said rings also engaging said terminal ring members respectively, external cam surfaces on said segmental rings, a solid ring associated with each segmental ring and having an internal cam surface engaging the external cam surface of the segmental ring, a series of bolts extending through said solid rings, segmental rings and electrode wheels, one electrode wheel having sockets on the inner side through which the bolts extend, thereby to enable nuts to be threaded on said bolts to enter said sockets so that by applying nuts to the ends of the bolts against the solid ring at the side of the electrode wheel having the sockets, the adjacent segmental ring is forced into engagement with its electrode wheel and respective terminal ring member, insulation between the electrode wheels, insulating sleeves on said bolts disposed between the socket nuts and the opposite ends of the bolts to provide a snug fit with the other electrode wheel, and nuts on such opposite ends of said bolts to engage the adjacent solid ring and force the adjacent segmental ring into engagement both with said other electrode wheel and the respective terminal ring member.

References Cited in the file of this patent

UNITED STATES PATENTS 2,006,835     Kurtze _____ July 2, 1935

FOREIGN PATENTS 715,406     Great Britain _____ Sept. 15, 1954